(12) United States Patent
House

(10) Patent No.: US 6,291,404 B2
(45) Date of Patent: Sep. 18, 2001

(54) VISCOSIFIED AQUEOUS CHITOSAN-CONTAINING WELL DRILLING AND SERVICING FLUIDS

(75) Inventor: Roy F. House, Houston, TX (US)

(73) Assignee: Venture Innovations, Inc., Lafayette, LA (US)

( * ) Notice: Subject to any disclaimer, the term of this patent is extended or adjusted under 35 U.S.C. 154(b) by 0 days.

(21) Appl. No.: 09/782,634

(22) Filed: Feb. 13, 2001

Related U.S. Application Data

(63) Continuation-in-part of application No. 09/222,293, filed on Dec. 28, 1998.

(51) Int. Cl.$^7$ ................................................. C09K 7/02
(52) U.S. Cl. ............................................. 507/110; 536/20
(58) Field of Search ................................... 507/110, 209, 507/211; 536/20, 55.3

(56) References Cited

U.S. PATENT DOCUMENTS

| | | | | |
|---|---|---|---|---|
| 4,424,346 | * | 1/1984 | Hall et al. | 536/20 |
| 5,328,939 | * | 7/1994 | Smith | 536/20 |
| 5,747,475 | * | 5/1998 | Nordquist et al. | 536/20 |

* cited by examiner

*Primary Examiner*—Philip Tucker
(74) *Attorney, Agent, or Firm*—Roy F. House

(57) ABSTRACT

The invention provides aqueous viscous or gelled alkaline fluids particularly useful in oil and gas well operations, and a method of drilling a well therewith. The fluids contain chitosan, an amine reactive acid, and an aldehyde therein, whereby the amine reactive acid and the aldehyde react with the primary amino group on the chitosan to increase the viscosity and stability of the fluid. The fluids are also useful wherein other chitosan-containing fluids are utilized. The preferred amine reactive acid is glyoxylic acid, and the preferred aldehyde is lactose.

13 Claims, No Drawings

US 6,291,404 B2

VISCOSIFIED AQUEOUS CHITOSAN-CONTAINING WELL DRILLING AND SERVICING FLUIDS

The present patent application is a continuation-in-part application of co-pending patent application Ser. No. 09/222,293 filed Dec. 28, 1998, pending incorporated herein by reference.

This invention was made with Government support under Award No. DMI-9901868 awarded by the National Science Foundation. The Government has certain rights in this invention.

FIELD OF THE INVENTION

The invention pertains to the in-situ modification of chitosan to produce viscosifiers (thickeners, gellants) for aqueous liquids, and to viscosified aqueous liquids containing such modified chitosans dispersed therein, and to methods of drilling a well utilizing such fluids.

BACKGROUND OF THE INVENTION

Many viscosifiers for, and methods of, increasing the viscosity of aqueous liquids are known. Such viscosifiers may be so-called water-soluble polymers such as biopolymers, gums, cellulose derivatives, alginates, and other polysaccharides or polysaccharide derivatives, and various synthetic polymers. Representative polymers are set forth in the book "Handbook of Water Soluble Gums and Resins," Robert L. Davidson, Ed., 1980.

Noticeably absent from this book is any mention of chitosan or derivatives thereof Viscoelastic fluids are characterized as having a rheological profile which is shear thinning, having a high viscosity at extremely low shear rates and a low viscosity at high shear rates. Thus such fluids are pseudoplastic having a high yield stress.

This type of rheology is produced by hydrating in the fluid certain water soluble polymers. These polymers presently known are biopolymers, i.e., microbially produced polysaccharides or heteropolysaccharides, and are well known in the art.

There is a need for fluids which exhibit a high low shear rate viscosity which are shear thinning.

Chitosan is a partially or fully deacetylated form of chitin, a naturally occurring polysaccharide. Structurally, chitin is a polysaccharide consisting of beta-(1→4)2-acetanido-2-deoxy-D-glucose units, some of which are deacetylated. The degree of deacetylation usually varies between 8 and 15 percent, but depends on the species from which the chitin is obtained, and the method used for isolation and purification.

Chitin is not one polymer with a fixed stoichiometry, but a class of polymers of N-acetylglucosamine with different crystal structures and degrees of deacetylation, and with fairly large variability from species to species. The polysaccharide obtained by more extensive deacetylation of chitin is chitosan.

Like chitin, chitosan is a generic term for a group of polymers of acetylglucosamine, but with a degree of deacetylation of between 50 and 100 percent. Chitosan is the beta-(1–4)-polysaccharide of D-glucamine, and is structurally similar to cellulose, except that the C-2 hydroxyl group in celullose is substituted with a primary amine group in chitosan. The large number of free amine groups (pKa=6.3) makes chitosan a polymeric weak base. Both chitin and chitosan are insoluble in water, dilute aqueous bases, and most organic solvents. However, unlike chitin, chitosan is soluble in dilute aqueous acids, usually carboxylic acids, as the chitosonium salt. Solubility in dilute aqueous acid is therefore a simple way to distinguish chitin from chitosan.

Chitosan is unique in that it is a polysaccbaride containing primary amine groups. Chitosan forms water-soluble salts with many organic and inorganic acids.

It is known to prepare chitosan derivatives by attaching various groups to one or more hydroxyl groups of the chitosan, as in various cellulose derivatives, and/or in attaching various groups to the primary amino group of chitosan. Thus it is disclosed in Hall and Yalpani U.S. Pat. No. 4,424,346 that chitosan can be reacted with various aldehydes by Schiff base formation with the primary amino group. The reaction is conducted in the presence of a reducing agent, specifically sodium cyanoborohydride, to reduce the amino group formed to a secondary amino group, i.e., the chitosan undergoes reductive alkylation. The aldehyde reactants include aldose or ketose sugars, or sugars oxidizable or hydrolyzable to aldoses or ketoses, for example, glucose, galactose, arabinose, xylose, N-acetylglucosamine, lactose, cellobiose, maltose, and melibiose, and aromatic aldehydes containing at least one hydroxyl or carboxyl group. A paper which discusses the preparation and characteristics of the chitosan derivatives set forth in the Hall et al. U.S. Pat. No. 4,424,346 is "Some Chemical and Analytical Aspects of Polysaccharide Modifications. 3. Formation of Branched-Chain, Soluble Chitosan Derivatives," M. Yalpani and L. D. Hall, MACROMOLECULES 1984, 17, 272–281. These chitosan derivatives are disclosed to offer a wide range of solubility, gelling and compatibility properties.

A paper entitled "Chitosan Derivatives Bearing $C_{10}$-Alkyl Glycoside Branches: A Temperature-Induced Geiling Polysaccharide," K. R. Holme and L. D. Hall, Macromolecules 1991, 24, 3828–3833, discloses chitosan derivatives having mixed hydrophobic/hydrophilic branches.

U.S. Pat. No. 3,879,376, incorporated herein by reference, discloses chitosan derivatives formed by acylation of chitosan with a saturated or unsaturated organic diacid anhydride and their use as a skin-moisturizing agent in cosmetic compositions.

There is disclosed in co-pending U.S. patent application Ser. No. 09/222,293 filed Dec. 28, 1998, well drilling fluids containing chitosan and aldose or ketose sugars, and/or oligosaccharides of such sugars.

SUMMARY OF THE INVENTION

We have now determined that aqueous alkaline liquids useful where viscous or gelled liquids are needed such as in oil and gas well operations, such as drilling, fracturing, sand control, lost circulation control, completion, workover and the like can be formulated to contain chitosan, an amine reactive acid, and an aldehyde modifier. The chitosan, amine reactive acid, and aldehyde react to increase the viscosity of the liquid. Optionally, the fluids can contain other chitosan modifiers, such as organic anhydrides and epoxy compounds to increase the viscosity or enhance the stability of the fluids.

Thus, it is an object of the invention to provide aqueous alkaline well drilling and servicing fluids containing chitosan, an amine reactive acid, and an aldehyde modifier.

Another object of the invention is to provide a method of drilling a well comprising circulating in a wellbore during drilling an aqueous alkaline fluid containing chitosan, an amine reactive acid, and an aldehyde modifier therefore.

Yet another object of the invention is to provide aqueous alkaline fluids useful in oil and gas well operations comprising an aqueous liquid having incorporated therein chitosan, an acid, an amine reactive acid, and an aldehyde modifier, and an alkalizing additive.

These and other objects of this invention will be apparent to one skilled in the art upon reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF PREFERRED EMBODIMENTS

The invention particularly provides oil and gas well drilling and servicing fluids containing chitosan which is modified in-situ with one or more amine reactive acids and one or more aldehydes. The fluids are useful in various operations such as drilling, fracturing, sand control, lost circulation control, completion, workover, and the like. The preferred fluids are alkaline aqueous pseudoplastic fluids having a Brookfield 0.5 rpm viscosity (hereinafter sometimes referred to as "low shear rate viscosity" or "LSRV") of at least 5,000 centipoise and a shear thining index (hereinafter sometimes referred to as "STI") greater than about 10. The STI is the ratio of the Brookfield viscosity at 0.5 rpm to the Brookfield viscosity at 100 rpm and is an indication of the shear thinning, pseudoplastic characteristic of the fluids. Preferably the LSRV is at least about 10,000 centipoise, most preferably at least about 20,000 centipoise.

The chitosans useful in the fluids will have at least 50% of their amino groups deacetylated, i.e., the degree of deacetylation is at least 50%, preferably at least 70%, and most preferably from about 85% to 100%.

The concentration of chitosan in the fluids will be sufficient when reacted in-situ with the amine reactive acid(s) and aldehyde(s) to impart to the fluids the rheological characteristics desired. Generally, the concentration of chitosan will be from about 0.5 lb/bbl (0.143% w/v) to about 5 lb/bbl (1.429% w/v), preferably from about 1 lb/bbl (0.286% w/v) to about 4 lb/bbl (1.143% w/v).

The fluids are initially preferably prepared by forming an acidic aqueous chitosan solution/dispersion containing the amine reactive acid modifier, wherein the pH is from about 1.5 to about 5, preferably from about 2 to about 4, adding the aldehyde(s), and thereafter raising the pH to basic, i.e., to a pH of about 7.5 or above, preferably from about 8 to about 11.

As used herein the term "amine reactive acid" is meant to be an acid which contains a functional group which reacts with the primary amino (amine) group of chitosan to form a covalent bond. Thus the amine reactive acid may contain an aldehyde (—CH=O) group which reacts with amines through the Schiff base reaction, an oxo (=O) group which similarly reacts, an epoxy

group which reacts with ring opening, and mixtures thereof. Excluded from the term "amine reactive acid" are acids which form an ionic bond with the primary amino group of chitosan, such as alkanoic acids, inorganic acids, and the like. Also excluded from the term "amine reactive acid" are acids which may react with the primary amino group of chitosan to form an amide.

Representative amine reactive acids containing an aldehyde group are glyoxylic (oxo-acetic) acid and 4-carboxybenzaldehyde. A representative amine reactive acid containing an oxo group is pyruvic acid (2-oxo-propanoic acid).

The concentration of amine reactive acid in the fluids is dependent on the concentration of the chitosan in the fluids. Generally the weight ratio of amine reactive acid to chitosan is from about 0.25 to 1 to about 4 to 1, preferably from about 0.25 to 1 to about 3 to 1.

As indicated, when preparing the fluids initially, it is preferable that the pH of the fluids is from about 1.5 to about 5, preferably from about 2 to about 4, before adding an alkalizing additive to raise the pH of the fluid such that the final fluid is alkaline. In the event that the amine reactive acid does not lower the pH to the desired range, then the pH is further lowered by the addition of an acid.

A wide variety of acids can be used to solublize chitosan. Such acids include inorganic acids such as hydrochloric acid, nitric acid, and sulfamic acid, and water soluble organic acids represented by the formula: R—(COOH)$_n$ wherein n has a value of 1 to 3 and R represents a mono-or divalent organic radical composed of carbon, hydrogen, and optionally at least one of oxygen, nitrogen, and sulfur. Exemplary organic acids are the mono-and dicarboxylic acids such as formic, acetic, N-acetylglycine, acetyisalicylic, glycolic, lactic, malic, 2-pyrrolidone-5-carboxylic, salicylic, glutamic, glutaric, malonic, and thioglycolic acids.

The preferred acid used to adjust the initial pH of the fluids is selected from the group consisting of (a) monocarboxylic acids containing from one to three carbon atoms, (b) substituted monocarboxylic acids containing at least one radical per molecule selected from the group consisting of hydroxyl, amino, chloro, and thio, and containing from one to three carbon atoms, and (c) mixtures thereof, most preferably acetic acid or glycolic acid.

The concentration of acid should be sufficient to decrease the pH of the solution to the desired range.

The basic compound used to raise the pH to the alkaline range can be any compatible base which can be determined by routine testing. Preferred basic compounds are the alkali metal and ammonium hydroxides, carbonates, sulfites, and bisulfites, and mixtures thereof. Organic bases such as low molecular weight amines and hydroxyamines, such as ethanolamnine and the like, can be used to raise the pH, also in combination with an inorganic basic compound. Preferred bases are the alkali metal carbonates.

The fluids of the invention also contain one or more aldehydes to react with the chitosan and the chitosan/amine reactive acid derivatives present in the fluids. Representative aldehydes include alkanals containing from 1 to 20 carbon atoms, substituted alkanals containing one or more functional groups selected from the group consisting of hydroxyl, carboxyl, amino, keto, aldehydro (—CHO), and mixtures thereof, benzaldehyde, substituted benzaldehydes wherein the benzene ring contains one or more functional groups, selected from the group consisting of hydroxyl, carboxyl, and mixtures thereof, aldose or ketose sugars and oligosaccharides of the sugars containing up to about 10 sugar groups per molecule, and mixtures thereof. Exemplary alkanals are formaldehyde, propional, butanal, dodecanal, and the like. Exemplary substituted alkanals contain such substituent groups as hydroxyl, carboxyl, amino, keto, —CHO, and the like, such as glyoxal, glutaraldehyde, glyceraldehyde, and pyruvaldehyde. Exemplary substituted benzaldehydes include salicylaldehyde, 4-carboxybenzaldehyde, 4-hydroxybenzaldehyde, vanillin, 3-formyl-2-hydroxy aldehyde, and the like. Representative sugars are selected from the group consisting of arabinose, galactose, glucose, mannose, xylose, and mixtures thereof. Oligosaccharides containing from about two to about ten combined sugar units from the above group may be present in the fluids of the invention.

A preferred oligosaccharide is lactose, a disaccharide containing one glucose sugar unit and one galactose sugar unit per molecule. Other suitable oligosaccharides include such disaccharides as dextrose, maltose, melibiose, and cellobiose.

A mixture of oligosacchrrides (hereinafter sometimes referred to as "OSM") useful in the present invention is obtained from the thermal hydrolysis of lignocellulose materials. The thermal hydrolysis may be carried out in any one of several manners such as by subjecting wood of trees and woody materials of corn stalks, cane, and other vegetable growths to the action of steam under elevated temperatures and pressures. The OSM may also be obtained by acid hydrolysis of lignocelluloses as well as by saccharification of wood. Preferably, however, the thermal hydrolysis is carried out by charging wood chips to a closed chamber (e.g., a gun as set forth in Mason U.S. Pat. No. 1,824,221, incorporated herein by reference), subjecting the chips to pressure of about 200–1200 pounds per square inch and a temperature of about 200–300° C. for approximately 30 minutes to 5 seconds, respectively, in the presence of steam, and then discharging the woody material from the gun through a constricted discharge means therein into a zone of lower pressure, preferably atmospheric pressure, thereby exploding the wood chips into comparatively finely divided elongated fibers. Under this treatment the wood undergoes hydrolysis, and water-insoluble and readily hydrolyzable constituents thereof are rendered soluble or dispersible in water. These water solubles are removed from the fiber, which may be accomplished by washing the fiber in water or by squeezing the fiber with rolls and/or screws and the like apparatus. See for example Boehrn U.S. Pat. No. 2,224,135, incorporated herein by reference. The water solubles can be concentrated or rendered solid by removing water therefrom, as by evaporation, drying, etc.

Water solubles resulting from such hydrolysis of lignocellulose materials as a class are applicable to this invention. A typical analysis of the water solubles, the OSM of this invention, made from pine wood is as follows: hexosans, 40% by weight; pentosans, 30% by weight; lignin, 15% by weight; non-sugar carbohydrates, 10% by weight; and gums, 5% by weight. The constituents of the OSM will vary somewhat depending on the type of lignocelullose material hydrolyzed and the conditions, e.g., time, temperature, pressure, etc. Depending upon these conditions, the constituents of the OSM can vary roughly as follows: pentosans and hexosans, 60–80% by weight; lignin, 5–25% by weight; non-sugar carbohydrates, 5–15% by weight; and gums, 2–8% by weight. From the above description it will be seen that the major proportion of the water solubles consists of carbohydrate material. A more detailed analysis of the water solubles has indicated that the carbohydrate mixture is composed of oligosaccharides consisting of mannose, arabinose, glucose, galactose, and xylose sugar units. The crude water solubles from which relatively all of the suspended material has been removed consists almost entirely of the above described oligosaccharide mixture. There is a relatively small fraction present, about up to about 15% thereof, of monosaccharides. A larger fraction of the dissolved solids, i.e., greater than about 50% thereof, consists of hexose and pentose oligosaccharides containing from 2 to 5 of the corresponding monosaccharide sugar units which are predominantly those named above. The remainder of the dissolved solids has been found to consist of oligosaccharides having more than about 6 sugar units of the same 5 and 6 carbon characters. In most instances, the filter water solubles contain only from about 3 to about 5% of lignin.

Other oligosaccharide mixtures useful in the practice of this invention include cane syrup solids, corn solubles, and the like.

Generally the concentration of the aldehyde will be from about 1.4 kg/m$^3$ (0.5 ppb) to about 57 kg/m$^3$ (20 ppb), preferably from about 2.85 kg/m$^3$ (1.0 ppb) to about 43 kg/m$^3$ (15 ppb).

The water base borehole fluids and well servicing fluids of this invention generally will contain materials well known in the art to provide various characteristics of properties to the fluid. Thus the fluids may contain one or more viscosifiers or suspending agents in addition to the chitosan, weighting agents, corrosion inhibitors, soluble salts, biocides, fungicides, seepage loss control additives, bridging agents, deflocculants, lubricity additives, shale control additives, pH control additives, and other additives as desired.

The borehole fluids may contain one or more materials which finction as encapsulating or fluid loss control additives to restrict the entry of liquid from the fluid to the contacted shale. Representative materials known in the art include partially solublized starch, gelatinized starch, starch derivatives, cellulose derivatives, humic acid salts (lignite salts), lignosulfonates, gums, biopolymers, synthetic water soluble polymers, and mixtures thereof.

The oil and gas well drilling and servicing fluids of this invention preferably have a pH in the range from about 7.5 to about 11.5, most preferably from 8 to about 11.

If desired, water soluble potassium compounds can be incorporated into the fluids of this invention to increase the potassium ion content thereof. Thus it is known to add potassium chloride, potassium formate, potassium acetate, and the like to fluids to enhance the shale stabilizing characterstics of the fluids.

The well drilling and servicing fluids of this invention contains an aqueous phase which may be fresh water, a natural brine, sea water or a formulated brine. The formulated brine is mranufactured by dissolving one or more soluble salts in water, a natural brine, or sea water. Representative soluble salts are the chloride, bromide, acetate and formate salts of potassium and sodium.

The borehole fluid of this invention is circulated or spotted within a borehole during well drilling or servicing operations as is well known in the art. Fracturing fluids are used to hydraulically fracture subterranean formations as is well known in the art.

Mixures of chitosan and the amine reactive acid and the aldehyde can be prepared for addition to the alkaline fluids of this invention for maintenance of the properties thereof, or indeed, for preparing the initially prepared acidic oil and gas well drilling and servicing fluids before adding the alkalizing additive thereto. Preferably the mixture of chitosan and the amine reactive acid and/or the aldehyde are treated such that the chitosan and the amine reactive acid and/or the aldehyde are at least partially reacted prior to addition to the fluid.

As indicated hereinbefore, the fluids set forth herein are useful in drilling a well wherein there is circulated in a wellbore (borehole) a drilling fluid during the driving thereof. Such processes are well known in the art. Generally, the method of drilling a well penetrating a subterranean formation comprises circulating an aqueous alkaline chitosan-containing fluid of this invention as set forth herein through the well by introducing the drilling fluid into the well and into contact with the formation and withdrawing the drilling fluid from the well to remove cuttings therefrom. The fluids can be formulated for use as spotting fluids for use in releasing stuck pipe or tools within a borehole wherein the fluid is circulated to the depth in the borehole of the stuck pipe or tool and in a volume sufficient to displace the fluid in the borehole over the entire stuck area, and allowing the spotting fluid to soak for a period of time sufficient to release the stuck pipe or tool. The fluids can be formulated to provide viscous gels to overcome lost circulation problems in a wellbore as is known in the art.

In order to more completely describe the invention, the following non-limiting examples are given. In these examples and in this specification, the following abbreviations may be used: ml=mililiter; g=gram; cp=centipoise; ppb=pounds per 42 gallon barrel; OS=off-scale; lb/bbl= pounds per 42 gallon barrel; bbl=42 gallon barrel; kg/m$^3$= kilograms per cubic meter; rpm=revolutions per minute; LSRV=low shear rate viscosity in centipoise as determined with a Brookfield Viscometer at 0.5 rpm; STI=the shear thinning index obtained with a Brookfield Viscometer, which is the ratio of the 0.5 rpm viscosity to the 100 rpm viscosity; OSM=oligosaccharide mixture obtained from thermally hydrolyzed wood; GAA=glacial acetic acid; GLY=glyoxylic acid.

EXAMPLE 1

The fluids set forth in Table 1 containing the indicated concentrations of glacial acetic acid, 50% glyoxylic acid, chitosan, lactose, and soda ash were prepared by mixing in a Hamilton Beach 6-speed blendor at low speed. The pH and Brookfield viscosities of the fluids are set forth in Table 1. Fluid 1-A, which contains no aldehyde (lactose), is not an example of the invention and is for comparative purposes only.

EXAMPLE 2

The fluids set forth in Table 2 were prepared as in Example 1. The pH and Brookfield viscosities of the fluids are set forth in Table 2. Fluid 2-A, which contains no glyoxylic acid, is not an example of the invention and is for comparative purposes only.

EXAMPLE 3

Concentrates containing the concentrations of chitosan, 50% glyoxylic acid, and lactose set forth in Table 3 were prepared by mixing in a Hamilton Beach 6-speed blendor at low speed with intermittent spatulation to insure homogeneity. Fluids were prepared from these concentrates by mixing with water the amount of each concentrate and soda ash set forth in Table 3. The equivalent concentrations of chitosan, glyoxylic acid, and lactose in the fluids are set forth in Table 3 in parentheses. The pH and Brookfield viscosities of the fluids are set forth in Table 3.

EXAMPLE 4

The fluids set forth in Table 4 were prepared by mixing together the indicated concentrations of glyoxylic acid, glacial acetic acid, chitosan, lactose, soda ash, and BLUE STREAK surfactant solution in an Osterizer blendor at medium speed. The pH and Brookfield viscosities of the fluids are set forth in Table 4. BLUE STREAK is an anionic surfactant solution sold by ActiSystems, Inc. of Edmond, Okla., U.S.A. Fluids 4-A and 4-B, which do not contain any glyoxylic acid, are not examples of the present invention.

EXAMPLE 5

A fluid was prepared having the composition of Fluid 4-1 in Table 4. The fluid was placed in a heated viscometer cup on a Brookfield Viscometer, with a No. 7 spindle, and static aged 16 hours at room temperature. The fluid was gelled. The viscosities were obtained and the temperature slowly increased to about 150° F. Periodically the viscosities were again taken. The data obtained are set forth in Table 5.

EXAMPLE 6

A fluid was prepared similar to Fluid 1-2, Table 1, except that the lactose was replaced by the oligosaccharide mixture obtained from the thermal hydrolysis of lignocellulose (MASONEX®, Masonite Corp). The initial 0.5 and 100 rpm viscosity were 160,000 cp and 5400 cp respectively. The fluid slowly gelled and was cohesive. After aging 12 days at room temperature the 0.5 rpm and 100 rpm viscosities were 400,000 cp and 1400 cp respectively.

TABLE 1

| Fluid | 1-A | 1-1 | 1-2 | 1-3 | 1-4 | 1-5 | 1-6 |
|---|---|---|---|---|---|---|---|
| Water, ml | 350 | 350 | 350 | 350 | 350 | 350 | 350 |
| GAA, g | 0 | 0 | 1.35 | 0.7 | 4 | 0.65 | 0.65 |
| 50% GLY, g | 4 | 4 | 0.65 | 1.3 | 4 | 2.85 | 2.85 |
| Chitosan, g | 1.5 | 1.5 | 2 | 2 | 2 | 2 | 2 |
| Lactose, g | 0 | 3 | 6 | 6 | 6 | 6 | 2 |
| Soda Ash, g | 2.6 | 2.65 | 5 | 5 | 11.5 | 5 | 5 |
| Initial Properties | | | | | | | |
| pH | 7.8 | 7.9 | 7.65 | 8.2 | 9.4 | 7.8 | 8.0 |

TABLE 1-continued

| Fluid | 1-A | 1-1 | 1-2 | 1-3 | 1-4 | 1-5 | 1-6 |
|---|---|---|---|---|---|---|---|
| Brookfield Viscosity, cp | | | | | | | |
| 0.5 rpm ($\times 10^{-3}$) | 0.4 | 96 | * | 80 | 130 | 800 | 880 |
| 100 rpm | 132 | 3280 | 10000 | 5800 | 5275 | 9400 | 25000 |
| STI | 3 | 29 | — | 14 | 25 | 85 | 35 |
| Rheology After Aging at Room Temperature | | | | | | | |
| Days Aged | 0 | 0 | 0 | 0 | 5 | 0 | 6 |
| Brookfield Viscosity, cp | | | | | | | |
| 0.5 rpm ($\times 10^{-3}$) | — | — | — | — | 520 | — | 252 |
| 100 rpm ($\times 10^{-3}$) | — | — | — | — | 36.7 | — | 1 |
| STI | — | — | — | — | 14 | — | 252 |

*0.5 rpm ranged from 529,000 to 2,660,000. Slowly gelled, Cohesive.

TABLE 2

| Fluid | 2-A | 2-1 | 2-2 | 2-3 | 2-4 | 2-5 |
|---|---|---|---|---|---|---|
| Water, ml | 350 | 350 | 350 | 350 | 350 | 350 |
| GAA, g | 4 | 4 | 4 | 4 | 4 | 4 |
| 50% GLY, g | 0 | 1 | 1.5 | 2 | 2.5 | 3 |
| Chitosan, g | 1.5 | 1.5 | 1.5 | 1.5 | 1.5 | 1.5 |
| Lactose, g | 4.5 | 4.5 | 4.5 | 4.5 | 4.5 | 4.5 |
| Soda Ash, g | 10 | 7 | 7.75 | 8.5 | 9.25 | 10 |
| Initial Properties | | | | | | |
| pH | 9.5 | 8.7 | 8.8 | 9 | 9.4 | 9.2 |
| Brookfield Viscosity, cp | | | | | | |
| 0.3 rpm ($\times 10^{-3}$) | 102 | 240 | 53.3 | 24 | 1.33 | 2.67 |
| 0.5 rpm ($\times 10^{-3}$) | 51.2 | 184 | 96 | 20.6 | 0.8 | 0.8 |
| 100 rpm | 512 | 5840 | 5280 | 2344 | 216 | 332 |
| STI | 100 | 32 | 18 | 9 | 4 | 2 |
| Rheology After Aging 1 Day at Room Temperature | | | | | | |
| Brookfield Viscosity, cp | | | | | | |
| 0.3 rpm ($\times 10^{-3}$) | 133 | 1210 | 1710 | 1040 | 1040 | 547 |
| 0.5 rpm ($\times 10^{-3}$) | 88 | 920 | 992 | 894 | 392 | 384 |
| 100 rpm | 520 | 0S | 34000 | 31200 | 13440 | 20320 |
| STI | 169 | — | 29 | 29 | 29 | 19 |
| Rheology After Aging 6 Days at Room Temperature | | | | | | |
| Brookfield Viscosity, cp | | | | | | |
| 0.3 rpm ($\times 10^{-3}$) | 53.3 | 707 | 440 | 760 | 707 | 827 |
| 0.5 rpm ($\times 10^{-3}$) | 24 | 472 | 248 | 432 | 504 | 560 |
| 100 rpm | 200 | 2380 | 3000 | 12880 | 32800 | 0S |
| STI | 120 | 198 | 83 | 67 | 15 | — |

TABLE 3

| Concentrate | A | B | C | D | E |
|---|---|---|---|---|---|
| Water, ml | 350 | 350 | 350 | 127 | 83.3 |
| 50% GLY, g | 25 | 25 | 15 | 33 | 20 |
| Chitosan, g | 10 | 10 | 10 | 10 | 10 |
| Lactose, g | 20 | 30 | 20 | 30 | 20 |
| Fluid | 3-1 | 3-2 | 3-3 | 3-4 | 3-5 |
| Water, ml | 280 | 280 | 280 | 324.6 | 333.3 |
| Concentrate, g | 82.5 | 84.5 | 80 | 40 | 26.7 |
| (Chitosan, g) | (2) | (2) | (2) | (2) | (2) |
| (50% GLY, g) | (5) | (5) | (3) | (6.6) | (4) |
| (Lactose, g) | (4) | (6) | (4) | (6) | (4) |
| pH | — | — | — | 2.7 | 3.0 |
| Soda Ash, g | 3.25 | 3.2 | 3.0 | 5.0 | 4.0 |
| Initial Properties | | | | | |
| pH | 9.7 | 8.9 | 9 | 8.9 | 9.8 |
| Brookfield Viscosity, cp | | | | | |
| 0.5 rpm ($\times 10^{-3}$) | 15.2 | 94 | 155 | 160 | 120 |
| 100 rpm | 550 | 3650 | 6500 | 7400 | 3800 |

TABLE 3-continued

| STI | 28 | 26 | 24 | 22 | 32 |
|---|---|---|---|---|---|
| Fluid Aged 3 Days at Room Temperature | | | | | |
| pH | 9.4 | 9.4 | 9 | — | — |
| Brookfield Viscosity, cp | | | | | |
| 0.5 rpm ($\times 10^{-3}$) | 76 | 280 | 280 | 520 | 380 |
| 100 rpm | 1705 | 14200 | 12100 | 21100 | 14800 |
| STI | 45 | 20 | 23 | 25 | 26 |

TABLE 4

| Fluid | 4-A | 4-B | 4-1 | 4-2 |
|---|---|---|---|---|
| Water, ml | 350 | 350 | 350 | 350 |
| 50% GLY, g | 0 | 0 | 3 | 3 |
| GAA, g | 4 | 4 | 4 | 4 |
| Chitosan, g | 1.5 | 1.5 | 1.5 | 1.5 |
| Lactose, g | 4.5 | 4.5 | 4.5 | 4.5 |
| pH | 3.1 | 3.1 | 2.5 | 2.4 |
| Soda Ash, g | 10 | 10 | 10 | 10 |
| BLUE STREAK, g | 0 | 1 | 0 | 1 |
| Fluids Aged 1 Hour at Room Temperature | | | | |
| pH | 9.5 | 9.5 | 9 | 9.2 |
| Brookfield Viscosity, cp | | | | |
| 0.3 rpm ($\times 10^{-3}$) | 95.3 | 216 | 2 | 3.3 |
| 0.5 rpm ($\times 10^{-3}$) | 60 | 155 | 1.2 | 2.0 |
| 100 rpm | 402 | 1092 | 690 | 920 |
| Fluid Aged 1 Day at Room Temperature | | | | |
| pH | 9.5 | 9.5 | 9.2 | 8.7 |
| Brookfield Viscosity, cp | | | | |
| 0.3 rpm ($\times 10^{-3}$) | 107 | 480 | 680 | 493 |
| 0.5 rpm ($\times 10^{-3}$) | 72 | 288 | 424 | 303 |
| 100 rpm | 2440 | 1880 | 26960 | 24040 |

TABLE 5

| Temperature, °F. | 70 | 81.3 | 113 | 152 | 154 | 153 |
|---|---|---|---|---|---|---|
| Brookfield Viscosity | | | | | | |
| 0.3 rpm ($\times 10^{-3}$) | 720 | 573 | 960 | 3920 | 20900 | 16400 |
| 0.5 rpm ($\times 10^{-3}$) | 312 | 288 | 704 | 848 | 17850 | 13400 |
| 100 rpm ($\times 10^{-3}$) | 14.16 | 20.12 | 38 | 32.56 | 24.4 | 14.56 |
| STI | 22 | 14 | 19 | 26 | 732 | 920 |

What is claimed is:

1. An aqueous alkaline fluid comprising an aqueous liquid having dispersed or solublized therein chitosan, an amine reactive acid, an aldehyde, and an alkalizing additive.

2. The fluid of claim 1 wherein the amine reactive acid contains an aldehydo group.

3. The fluid of claim 2 wherein the amine reactive acid is selected from the group consisting of substituted alkanals containing from two to twenty carbon atoms and containing one or more carboxyl groups, substituted benzaldehydes wherein the benzene ring contains at least one carboxyl group, and mixtures thereof.

4. The fluid of claim 1 wherein the amine reactive acid is selected from the group consisting of glyoxylic acid, pyruvic acid, 4-carboxybenzaldehyde, and mixtures thereof.

5. The fluid of claim 1, 2, 3, or 4 wherein the aldehyde is selected from the group consisting of alkanals containing from 1 to 20 carbon atoms, substituted alkanals containing one or more functional groups selected from the group consisting of hydroxyl, amino, keto, aldehydo, and mixtures thereof, benzaldehyde, substituted benzaldehydes wherein the benzene ring contains one or more functional groups selected from the group consisting of hydroxy, amino, and mixtures thereof, aldose sugars, ketose sugars, and oligosaccharides of the sugars containing up to about 10 sugar groups per molecule, and mixtures thereof.

6. The fluid of claim 1, 2, 3, or 4 wherein the aldehyde is (1) a pentosan or hexosan sugar selected from the group consisting of arabinose, galactose, glucose, mannose, xylose, and mixtures thereof or (2) an oligosaccharide of the sugars of (1) containing from two to about ten combined sugar units, and mixtures thereof.

7. The fluid of claim 6 wherein the aldehyde is lactose.

8. The fluid of claim 6 wherein the aldehyde is the water soluble portion of thermally hydrolyzed lignocellulose.

9. A method of drilling a well wherein a drilling fluid is circulated in the wellbore during drilling comprising circulating as the drilling fluid the aqueous alkaline fluid of claim 1, 2, 3, or 4.

10. The method of drilling a well wherein a drilling fluid is circulated in the wellbore during drilling comprising circulating as the drilling fluid the aqueous alkaline fluid of claim 1, 2, 3 or 4, wherein the aldehyde is selected from the group consisting of alkanals containing from 1 to 20 carbon atoms, substituted alkanals containing one or more functional groups selected from the group consisting of hydroxyl, amino, keto, aldehydo, and mixtures thereof, benzaldehyde, substituted benzaldehydes wherein the benzene ring contains one or more functional groups selected from the group consisting of hydroxy, amino, and mixtures thereof, aldose sugars, ketose sugars, and oligosaccharides of the sugars containing up to about 10 sugar groups per molecule, and mixtures thereof.

11. The method of drilling a well wherein a drilling fluid is circulated in the wellbore during drilling comprising circulating as the drilling fluid the aqueous alkaline fluid of claim 1, 2, 3, or 4, wherein the aldehyde is (1) a pentosan or hexosan sugar selected from the group consisting of arabinose, galactose, glucose, mannose, xylose, and, mixtures thereof or (2) an oligosaccharide of the sugars of (1) containing from two to about ten combined sugar units, and mixhres thereof.

12. The method of claim 11 wherein the aldehyde is lactose.

13. The method of claim 11 wherein the aldehyde is the water soluble portion of thermally hydrolyzed lignocellulose.

* * * * *